US011445419B1

(12) United States Patent
Malhotra et al.

(10) Patent No.: US 11,445,419 B1
(45) Date of Patent: Sep. 13, 2022

(54) DATA GATEWAY SELECTION FOR WIRELESS USER EQUIPMENT (UE) HANDOVER (71) Applicant: T-MOBILE INNOVATIONS LLC, Overland Park, KS (US)

(72) Inventors: Rajil Malhotra, Olathe, KS (US); Anuj Sharma, Broadlands, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 204 days.

(21) Appl. No.: 16/914,568

(22) Filed: Jun. 29, 2020

(51) Int. Cl.
*H04W 4/00* (2018.01)
*H04W 36/08* (2009.01)
*H04W 88/16* (2009.01)

(52) U.S. Cl.
CPC ............ *H04W 36/08* (2013.01); *H04W 88/16* (2013.01)

(58) Field of Classification Search
CPC combination set(s) only.
See application file for complete search history.

(56) References Cited

U.S. PATENT DOCUMENTS

| 7,852,787 | B2 | 12/2010 | Gelbman et al. | |
| 8,265,038 | B2 | 9/2012 | Kezys et al. | |
| 8,699,461 | B2 | 4/2014 | Qian et al. | |
| 8,831,014 | B2 | 9/2014 | Koodli et al. | |
| 9,119,113 | B2 | 8/2015 | Cheng et al. | |
| 9,241,255 | B2 | 1/2016 | Vesterinen et al. | |
| 9,439,137 | B2 | 9/2016 | Kim et al. | |
| 10,728,817 | B1 * | 7/2020 | Kaki ...................... | H04W 36/14 |
| 11,271,699 | B1 * | 3/2022 | Eyuboglu ............... | H04L 5/005 |
| 2017/0070923 | A1 | 3/2017 | Li et al. | |
| 2018/0198672 | A1 | 7/2018 | Zuniga et al. | |
| 2021/0105685 | A1 * | 4/2021 | Li .......................... | H04W 36/14 |

* cited by examiner

*Primary Examiner* — Justin Y Lee (57) ABSTRACT

A Fifth Generation (5G) access node exchanges user data with User Equipment (UE) and exchanges the user data with a 5G User Plane Function (UPF). A 5G Core (5GC) identifies a handover to a Long Term Evolution (LTE) access node. In response, the 5GC selects an LTE Gateway Identifier (GW ID) for an LTE gateway that is physically co-located with the 5G UPF. The 5GC transfers handover signaling indicating the LTE GW ID and the LTE access node ID to a Mobility Management Entity (MME). The MME transfers signaling to the LTE access node and the LTE gateway. The LTE access node wirelessly exchanges user data with the UE and exchanges the user data with the LTE GW in response to the signaling. The LTE gateway exchanges the user data with the LTE access node.

20 Claims, 9 Drawing Sheets

DATA GATEWAY SELECTION FOR WIRELESS USER EQUIPMENT (UE) HANDOVER

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), Millimeter-Wave (MMW), and Low-Power Wide Area Network (LP-WAN).

The wireless access nodes handover the wireless user devices among one another for various reasons. User mobility causes handovers as wireless signals from serving access nodes weaken, and wireless signals from target access nodes strengthen. Service fallback causes handovers as the serving access nodes transfer wireless user devices to target access nodes to deliver a specific data services like voice-calling or video-conferencing. Load balancing also causes handovers as the serving access nodes transfer wireless user devices to the target access nodes to avoid the overuse of radio resources in the serving access nodes along with the simultaneous underuse of radio resources in the target access nodes.

Some handovers are between different wireless communication networks like handovers from a 5GNR network to an LTE network or from an MMW network to a 5GNR network. The wireless user devices and the serving communication networks typically select the target communication networks and the target access nodes. To complete the handovers, the target communication networks select additional network elements like data gateways that will handle the user data in the target communication networks after the handovers. The target communication networks often use Domain Name Systems (DNS) to select these additional network elements based on input data like the target access node ID. The handovers between the wireless communication networks require extensive network signaling. Unfortunately, the DNS increases the network signaling load and delays handover completion.

TECHNICAL OVERVIEW

A Fifth Generation (5G) access node exchanges user data with User Equipment (UE) and exchanges the user data with a 5G User Plane Function (UPF). A 5G Core (5GC) identifies a handover to a Long Term Evolution (LTE) access node. In response, the 5GC selects an LTE Gateway Identifier (GW ID) for an LTE gateway that is physically co-located with the 5G UPF. The 5GC transfers handover signaling indicating the LTE GW ID and the LTE access node ID to a Mobility Management Entity (MME). The MME transfers signaling to the LTE access node and the LTE gateway. The LTE access node wirelessly exchanges user data with the UE and exchanges the user data with the LTE GW in response to the signaling. The LTE gateway exchanges the user data with the LTE access node.

DETAILED DESCRIPTION

Figure 1:
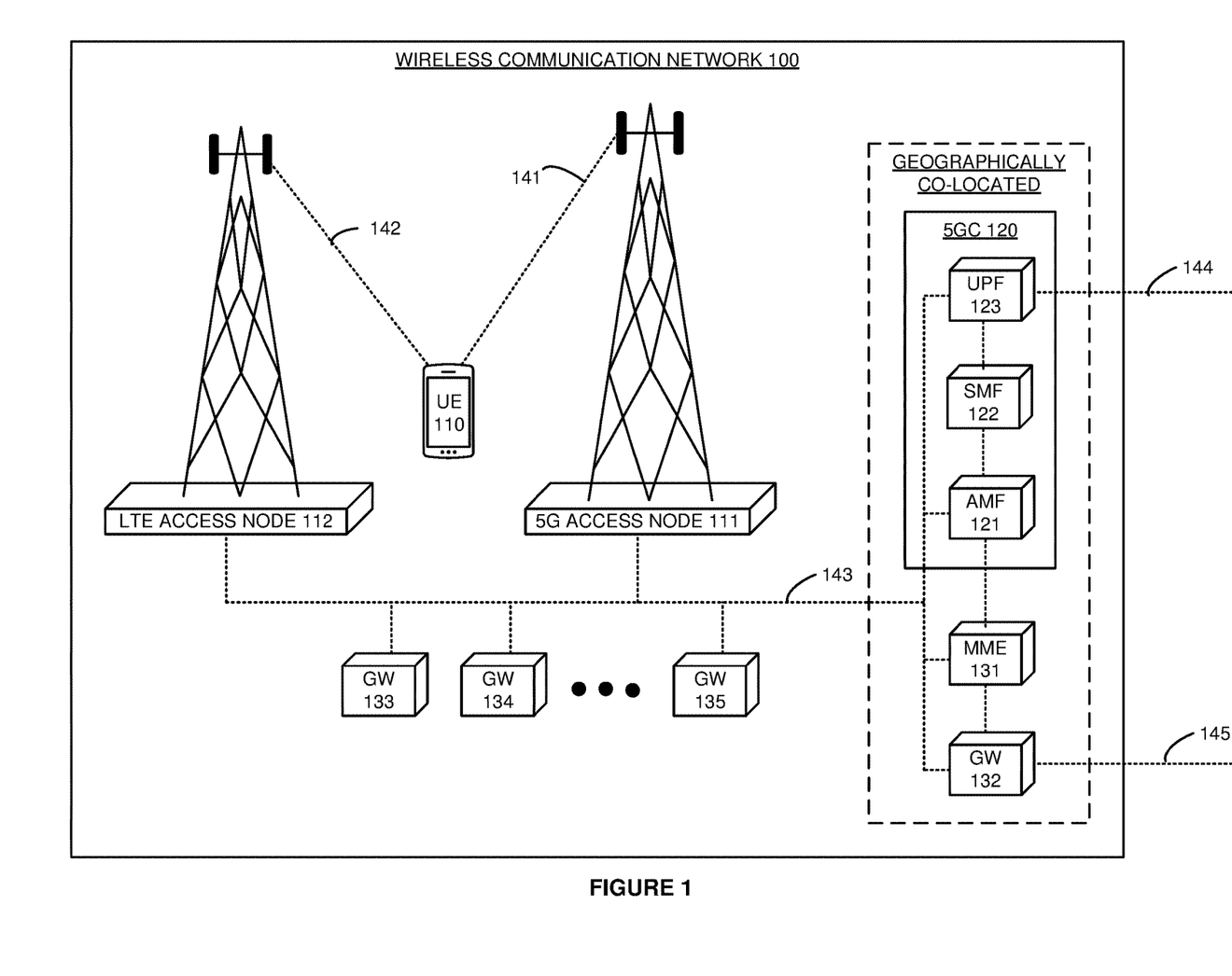
FIG. 1 illustrates a wireless communication network to handover a wireless User Equipment (UE).

FIG. 1 illustrates wireless communication network 100 to handover wireless User Equipment (UE) 110. Wireless communication network 100 delivers wireless data services like video-calling, interactive-gaming, media-streaming, augmented-reality, machine-control, and/or some other wireless networking product. Wireless communication network 100 comprises wireless UE 110, Fifth Generation New Radio (5GNR) access 111, Long Term Evolution (LTE) access node 112, Fifth Generation Core (5GC) 120, Mobility Management Entity (MME) 131, and LTE Gateways (GWs) 132-135. 5GC 120 comprises Access and Mobility Function (AMF) 121, Session Management Function (SMF) 122, and User Plane Function (UPF) 123. AMF 121, SMF 122, UPF 123, MME 131, and GW 132 are geographically co-located in the same physical site like the same data center or Network Function Virtualization Infrastructure (NFVI). In some examples, co-located UPF 123 and GW 132 are within 500 feet of one another. In some examples, co-located UPF 123 and GW 132 are executed in the same server rack and share a backplane.

Various examples of network operation and configuration are described herein. Before the handover from 5G access node 111 to LTE access node 112, wireless UE 110 and 5G access node 111 wirelessly exchange user data. 5G access node 111 and UPF 123 exchange the user data. UPF 123 and an external data system exchange the user data. An event at UE 110 like loss-of-signal or voice-fallback triggers a handover. 5GC 120 identifies the handover of wireless UE 110 from 5G access node 111 to LTE access node 112, and in response, 5GC 120 selects a Gateway Identifier (GW ID) for GW 132 because GW 132 is physically co-located with UPF 123 (and/or AMF 121, SMF 122, or some other network function in 5GC 120). LTE GWs 133-135 are available to handle the handover and could be selected, but GWs 133-35 are not selected because they are not co-located with 5GC 120 like GW 132. 5GC 120 transfers signaling indicating the ID for GW 132 and LTE access node 112 to LTE MME 131. MME 131 receives the signaling indicating the IDs for LTE GW 123 and LTE access node 112, and in response, MME 131 transfers signaling to LTE access node 112 and GW 132. Efficiently, MME 131 obtains the ID for GW 132 without accessing a Domain Name System (DNS) to select the ID.

After the handover from node 5G access node 111 to LTE access node 112, UE 110 and LTE access node 112 wirelessly exchange additional user data. LTE access node 112 and GW 132 exchange the additional user data in response to the signaling. LTE GW 132 and the other data system exchange the additional user data in response to the signaling.

In some examples, AMF 121 identifies the handover and transfers signaling to initiate the handover. AMF 121 may identify the handover based on a signal-strength comparison between nodes 111-112, voice-fallback from node 111 to node 112, load-balancing across nodes 111-112, or some other trigger. AMF 121 may transfer the signaling to 5G access node 111 in 5GC N2 messages. In some examples, SMF 122 selects the ID for GW 132 based on co-location with itself, UPF 123, AMF 121, and/or some other 5GC network function. Alternatively, AMF 121 may select the LTE GW ID based on 5GC co-location.

In some examples, GW 132 comprises a System Evolution Architecture Gateway User Plane (SAE GW-U) and an SAE GW Control Plane (SAE GW-C). In these examples, 5GC 120 selects the ID for the SAE GW-U and/or the SAE GW-C based on co-location with UPF 123, SMF 122, AMF 121, and/or some other 5GC network function. MME 131 transfers signaling to the SAE GW-C to direct the handover. The SAE GW-C receives the signaling from MME 131 and transfers corresponding signaling to the SAE GW-U. The SAE GW-U exchanges the additional user data with LTE access node 112 and with the external data system responsive to the signaling. In other examples, GW 132 comprises a Serving Gateway (SGW) and/or a Packet Data Network Gateway (P-GW).

UE 110 wirelessly communicates with 5GNR access node 111 over 5GNR link 141. UE 110 wirelessly communicates with LTE access node 112 over LTE link 142. Wireless links 141-142 use electromagnetic frequencies in the low-band, mid-band, high-band, or some other portion of the electromagnetic spectrum. 5G access node 111 communicates with AMF 121 and UPF 123 over backhaul links 143. LTE access node 111 communicates with MME 131 and GWs 132-135 over backhaul links 143. UPF 123 communicates with external systems over data links 144. GW 132 communicates with external systems over data links 145. Links 143-145 use metal, glass, air, or some other media. Links 143-145 use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols.

Although UE 110 is depicted as a smartphone, UE 110 might instead comprise a computer, robot, vehicle, or some other data appliance with wireless communication circuitry. Access nodes 111-112 are depicted as towers, but nodes 111-112 may use other mounting structures or no mounting structure at all. UE 110 and access nodes 111-112 comprise antennas, amplifiers, filters, modulation, analog/digital interfaces, microprocessors, software, memories, transceivers, bus circuitry, and the like. Network elements 121-123 and 131-135 comprise microprocessors, memories, software, transceivers, bus circuitry, and the like.

The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Figure 2:
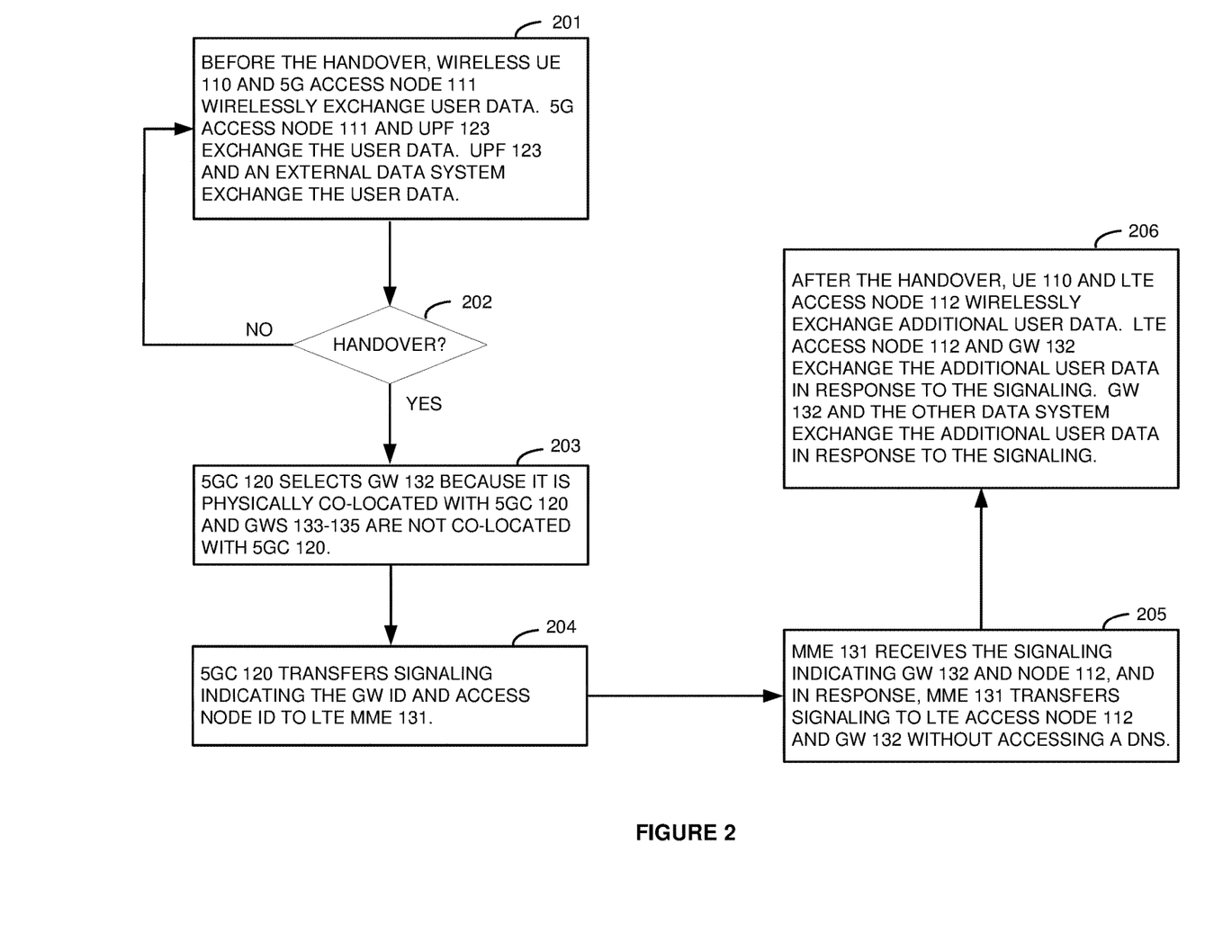
FIG. 2 illustrates an exemplary operation of the wireless communication network to handover the wireless UE.

FIG. 2 illustrates an exemplary operation of wireless communication network 100 to handover wireless UE 110. Before the handover, wireless UE 110 and 5G access node 111 wirelessly exchange user data (201). 5G access node 111 and UPF 123 exchange the user data (201). UPF 123 and an external data system exchange the user data (201). A voice-calling fallback event triggers a handover in this example, and 5GC 120 identifies the triggering event or its responsive signaling (202). In response to the handover (202), 5GC 120 selects GW 132 because it is physically co-located with at least a portion of 5GC 120 and GWs 133-135 are not co-located with 5GC 120 (203). 5GC 120 transfers signaling indicating the ID for GW 132 and LTE access node 112 to LTE MME 131 (204). LTE MME 131 receives the signaling indicating the IDs for GW 132 and LTE access node 112, and in response, MME 131 transfers signaling to LTE access node 112 and GW 132 without accessing a DNS to obtain the IDs (205). After the handover, UE 110 and LTE access node 112 wirelessly exchange additional user data (206). LTE access node 112 and GW 132 exchange the additional user data in response to the signaling (206). GW 132 and the other data system exchange the additional user data in response to the signaling (206).

Figure 3:
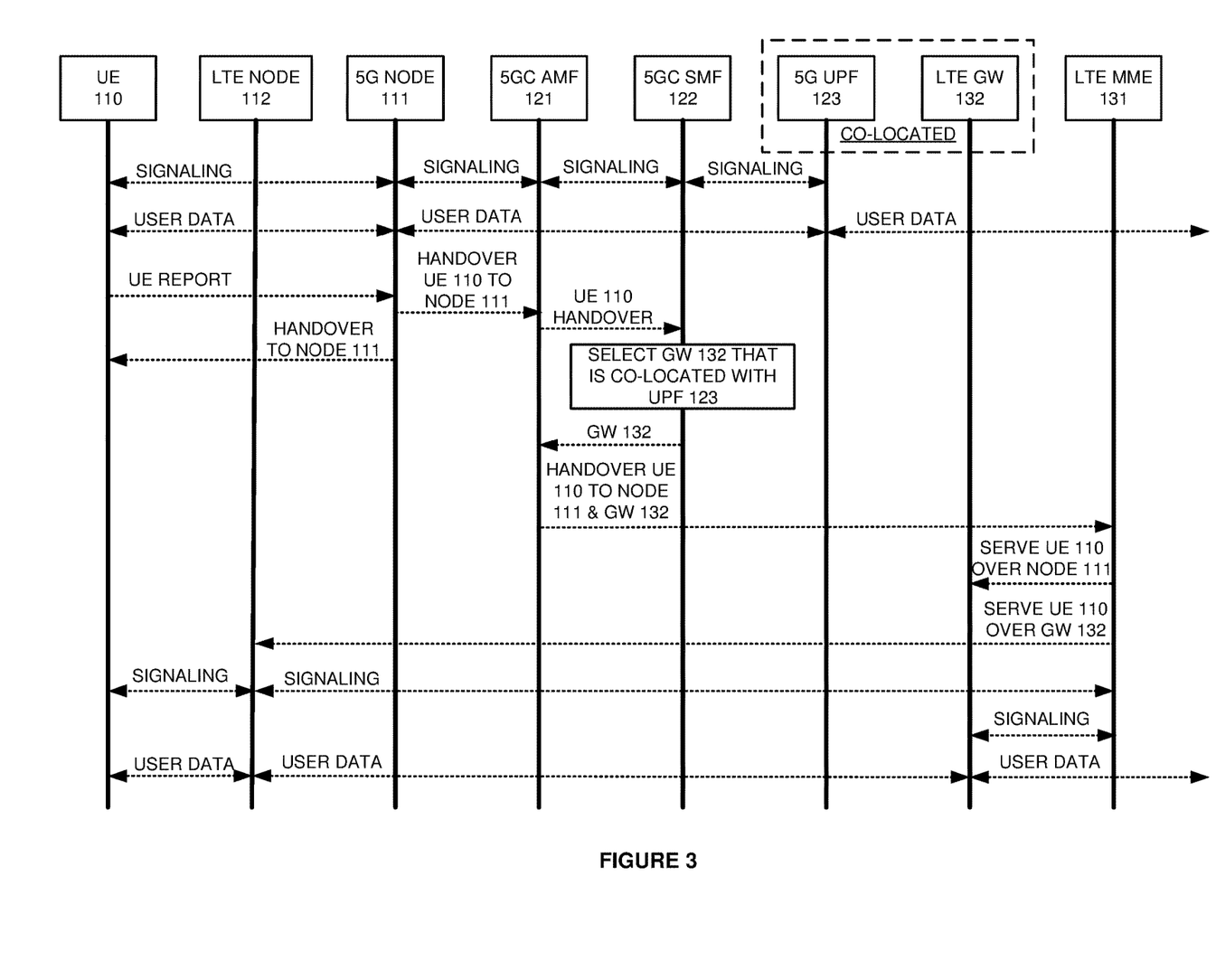
FIG. 3 illustrates an exemplary operation of the wireless communication network to handover the wireless UE.

FIG. 3 illustrates an exemplary operation of wireless communication network 100 to handover wireless UE 110. Before the handover, wireless UE 110 and 5G access node 111 wirelessly exchange signaling. 5G access node 111 and AMF 121 exchange signaling. AMF 121 and SMF 122 exchange signaling. SMF 122 and UPF 123 exchange signaling. In response to the signaling, wireless UE 110 and 5G access node 111 wirelessly exchange user data. 5G access node 111 and UPF 123 exchange the user data. UPF 123 exchanges the user data with an external data system. UE 110 measures and reports the signal strength of access nodes 111-112 to 5G access node 111. 5G access node 111 compares the signal strengths to trigger a handover of wireless UE 110 to LTE access node 112 in this example. 5G access node 111 transfers handover signaling to UE 110 and to AMF 121.

In response to the handover signaling, AMF 121 signals handover data to SMF 122, and SMF 122 selects GW 132 based on the co-location of GW 132 and UPF 123. For example, SMF 122 may host a data structure that correlates the UPFs that it controls with their co-located GWs like UPF 123/GW 132. SMF 122 identifies GW 132 to AMF 121. AMF 121 transfers signaling indicating GW 132 to LTE MME 131. MME 131 receives the signaling, and in response, MME 131 transfers signaling to LTE access node 112 and to GW 132. Wireless UE 110 and LTE access node 112 wirelessly exchange signaling. LTE access node 112 and MME 131 exchange signaling. MME 131 and GW 132 exchange signaling. In response to the signaling, UE 110 and LTE access node 112 wirelessly exchange additional user data. LTE access node 112 and GW 132 exchange the additional user data in response to the signaling. GW 132 and the other data system exchange the additional user data in response to the signaling.

Figure 4:
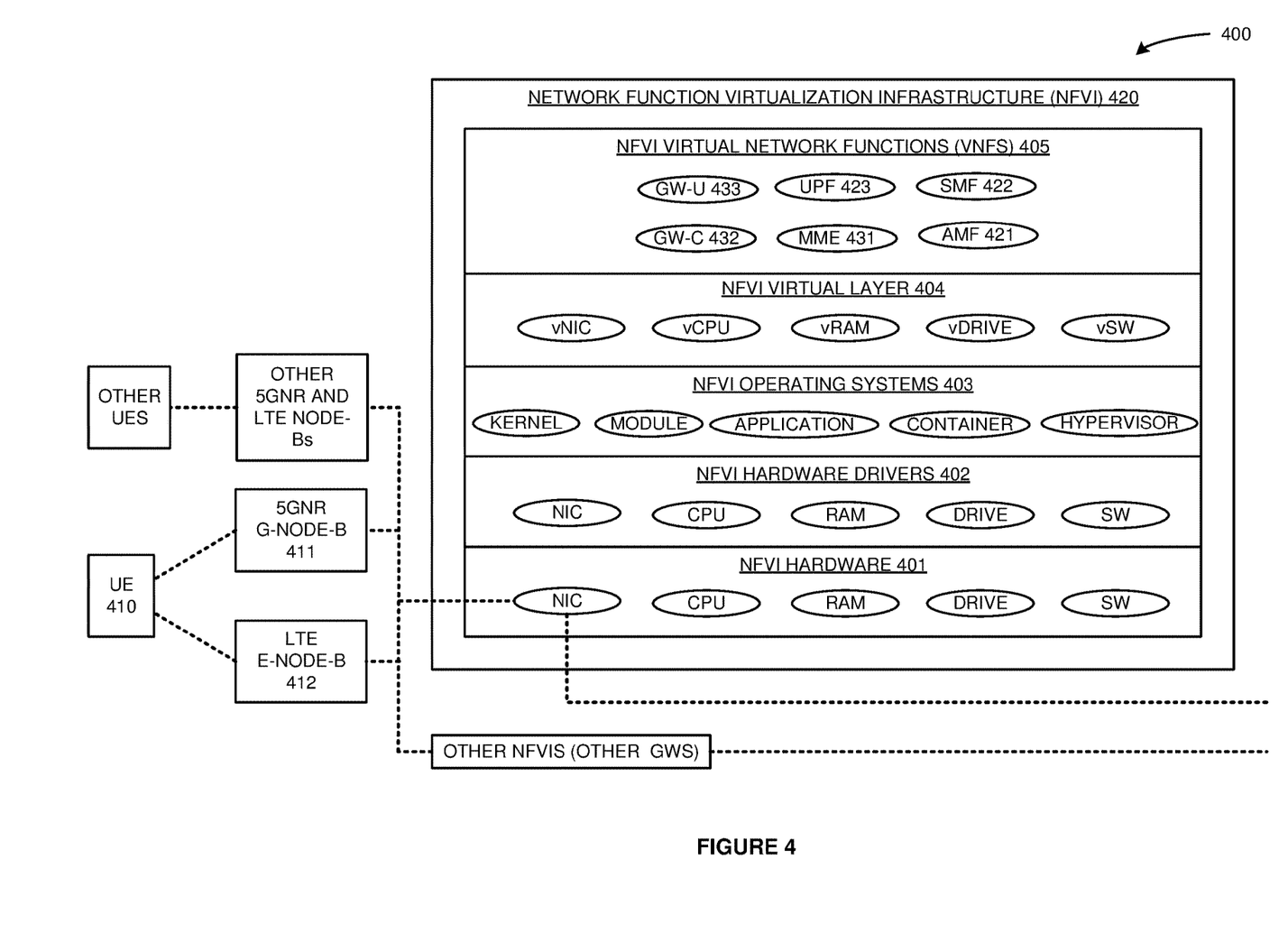
FIG. 4 illustrates a Network Function Virtualization Infrastructure (NFVI) to handover a wireless UE in a Fifth Generation Long Term Evolution (5G/LTE) network.

FIG. 4 illustrates Network Function Virtualization Infrastructure (NFVI) 420 to handover wireless UE 410 in 5G/LTE network 400. 5G/LTE network 400 comprises an example of wireless communication network 100, although network 100 may differ. NFVI 420 is an example of network elements 121-123 and 131-135, although these network elements may differ. 5G/LTE network 400 comprises UE 410, 5GNR gNodeB 411, LTE eNodeB 412, NFVI 420, other UEs, other 5GNR gNodeBs, other LTE eNodeBs, and other NFVIs.

NFVI 420 comprises NFVI hardware 401, NFVI hardware drivers 402, NFVI operating systems 403, NFVI virtual layer 404, and NFVI Virtual Network Functions (VNFs) 405. NFVI hardware 401 comprises Network Interface Cards (NIC), CPU, RAM, flash/disk drives, and data switches (SW). NFVI hardware drivers 402 comprise software that is resident in the NIC, CPU, RAM, DRIVE, and SW. NFVI operating systems 403 comprise kernels, modules, applications, containers, hypervisors, and the like. NFVI virtual layer 404 comprises virtual NICs (vNIC), virtual CPUs (vCPU), virtual RAM (vRAM), virtual Drives (vDRIVE), and virtual Switches (vSW). NFVI VNFs 405 comprise AMF 421, SMF 422, UPF 423, MME 431, System Architecture Evolution (SAE) Gateway Control Plane (SAE GW-C) 432, and SAE Gateway User Plane (GW-U) 433. Other LTE VNFs and 5GC VNFs are typically present but are omitted for clarity. The other NFVIs have other VNFs including other GWs. The NIC are coupled to NodeBs 411-412 and to the other NodeBs over backhaul links. The NIC are coupled to external systems over data links. NFVI hardware 401 executes NFVI hardware drivers 402, NFVI operating systems 403, NFVI virtual layer 404, and NFVI VNFs 405 to serve UE 410 and the other UEs over NodeBs 411-412 and the other NodeBs.

Before the handover from 5GNR gNodeB 411 to LTE eNodeB 412, wireless UE 410 and 5GNR gNodeB 111 wirelessly exchange user data. 5G gNodeB 411 and UPF 423 exchange the user data. UPF 423 and an external data system exchange the user data. An event at UE 410 like loss-of-signal or voice-fallback triggers the handover. In this example, AMF 421 identifies the handover of wireless UE 410 from 5GNR gNodeB 411 to LTE eNodeB 412 based on the ID for LTE eNodeB 412 in signaling from 5G gNodeB 411. AMF 421 signals handover information for UE 410 to SMF 422 in a PDU context request. In response, SMF 422 selects SAE GW-C 432 for UE 410 because SAE GW-C 432 is physically co-located with UPF 423 which serves UE 410. The other GWs in the other NFVIs are not co-located with UPF 123 and are not selected. SMF 422 transfers signaling indicating the ID for SAE GW-C 432 to AMF 431. AMF 431 selects MME 431 based on the ID of SAE GW-C 432 because MME 431 controls SAE GW-C 432. AMF 431 transfers a relocation request indicating UE 410, SAE GW-C 432, and LTE eNodeB 412 to LTE MME 431. Efficiently, MME 431 obtains the ID for SAE GW-C 432 without accessing a DNS. MME 431 transfers signaling to LTE eNodeB 412 and SAE GW-C 432. SAE GW-C 432 signals SAE GW-U 433 to serve UE 410 over LTE eNodeB 412. After the handover from 5GNR gNodeB 411 to LTE eNodeB 412, UE 410 and eNodeB 412 wirelessly exchange additional user data. LTE eNodeB 412 and SAE GW-U 433 exchange the additional user data in response to the signaling. SAE GW-U 433 and the other data system exchange the additional user data in response to the signaling.

Figure 5:
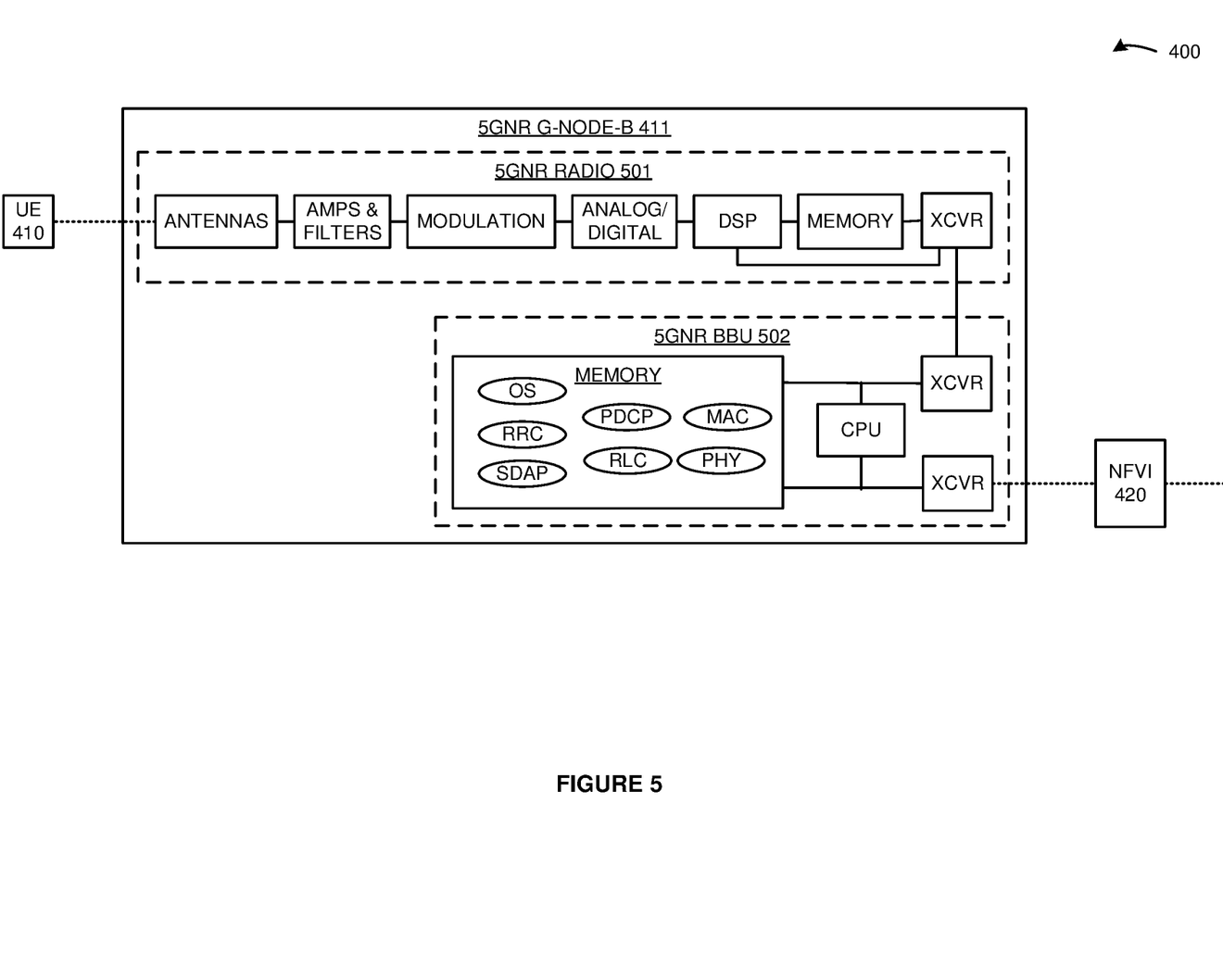
FIG. 5 illustrates a 5GNR gNodeB to handover the wireless UE in the 5G/LTE network.

FIG. 5 illustrates Fifth Generation New Radio (5GNR) gNodeB 411 to handover wireless UE 410 in 5GNR/LTE network 400. 5GNR gNodeB 411 is an example of 5G access node 112, although access node 112 may differ. 5GNR gNodeB 411 comprises 5GNR radio 501 and 5GNR BBU 502. 5GNR radio 501 comprises antennas, amplifiers, filters, modulation, analog-to-digital interfaces, DSP, memory, and transceivers that are coupled over bus circuitry. 5GNR BBU 502 comprises memory, CPU, and transceivers that are coupled over bus circuitry. The memory in BBU 502 stores operating systems and network applications like Physical Layer (PHY), Media Access Control (MAC), Radio Link Control (RLC), Packet Data Control Protocol (PDCP), Service Data Adaptation Protocol (SDAP), and Radio Resource Control (RRC). The CPU in 5GNR BBU 502 executes the operating systems, PHYs, MACs, RLCs, PDCPs, SDAPs, and RRCs to exchange: 5GNR signaling and user data with UE 410, 5GC signaling for UE 410 with AMF 421 in NFVI 420, and exchange 5GC data for UE 410 with UPF 423 in NFVI 420. UE 410 is wirelessly coupled to the antennas in 5GNR radio 501 over 5GNR links. A transceiver in 5GNR radio 501 is coupled to a transceiver in 5GNR BBU 502 over CPRI links. A transceiver in 5GNR BBU 502 is coupled to AMF 421 and UPF 423 over backhaul links.

In 5GNR radio 501, the antennas receive wireless 5GNR signals from UE 410 that transport UL 5GNR signaling and UL 5GNR data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR RRC processes the UL 5GNR signaling and DL 5GC N2 signaling from AMF 421 to generate new UL 5GC N2 signaling and new DL 5GNR signaling. The 5GNR RRC transfers the new UL 5GC N2 signaling to AMF 421. The 5GNR SDAP transfers corresponding UL 5GC N3 data to UPF 423 over backhaul links.

In 5GNR BBU 502, the 5GNR RRC receives the 5GC DL N2 signaling from AMF 421. The 5GNR SDAP receives DL 5GNR N3 data from UPF 423. The 5GNR network applications process the new DL 5GNR signaling and the DL 5GNR data to generate corresponding DL 5GNR symbols that carry the DL 5GNR signaling and DL 5GNR data. In 5GNR radio 501, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals to UE 410 that transport the DL 5GNR signaling and DL 5GNR data.

RRC functions comprise authentication, security, handover control, status reporting, Quality-of-Service (QoS), network broadcasts and pages, and network selection. SDAP functions include packet marking and QoS enforcement. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/ decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

UE 410 wirelessly attaches to 5GNR BBU 502 over 5GNR radio 501. 5GNR BBU 502 transfers initial UE signaling for UE 410 to AMF 421 in NFVI 420. AMF 421 responds with addressing, QoS, and the like for UE 410. 5GNR BBU 502 signals the network addressing and QoS to UE 410 over 5GNR radio 501. In response, UE 410 and the SDAP in 5GNR BBU 502 exchange user data over radio 501. 5GNR BBU 502 and UPF 423 in NFVI 420 exchange the user data over the backhaul links. UE 410 measures and reports the signal strengths from 5GNR gNodeB 411, LTE eNodeB 412, and other NodeBs to the RRC in BBU 602. The RRC initiates a handover when the signal strength difference between nodes 411-412 exceeds a handover threshold. The RRC in BBU 602 signals UE 410 to attach to LTE eNodeB 412 over radio 501. The RRC in BBU 602 signals AMF 421 in NFVI 420 that UE 410 is handing over from 5GNR gNodeB 411 to LTE eNodeB 412.

Figure 6:
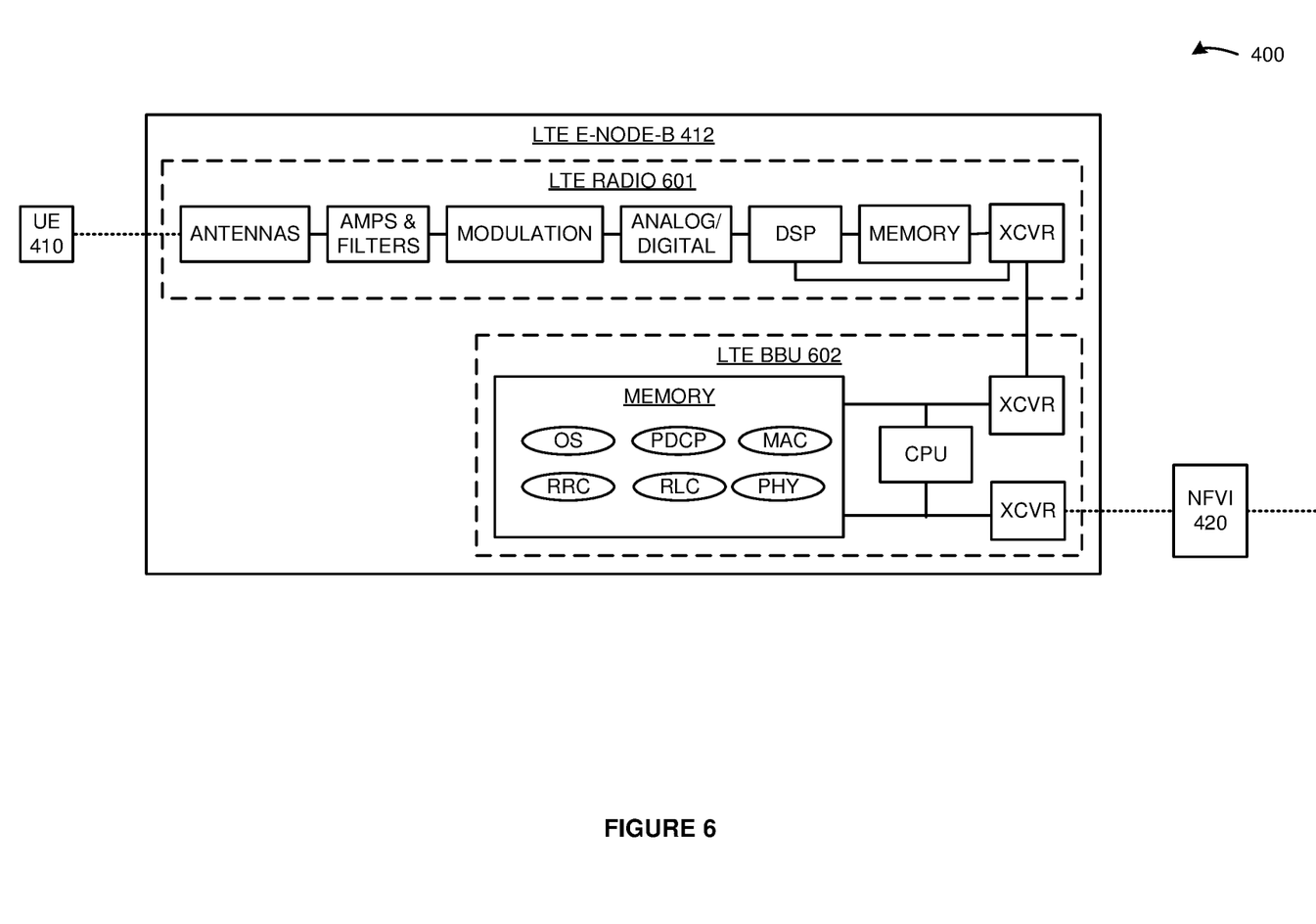
FIG. 6 illustrates an LTE eNodeB to receive the handover of the wireless UE in the 5G/LTE network.

FIG. 6 illustrates Long Term Evolution (LTE) eNodeB 412 to receive the handover of wireless UE 410 in 5GNR/LTE network 400. LTE eNodeB 412 is an example of LTE access node 112, although access node 112 may differ. LTE eNodeB 412 comprises LTE radio 601 and LTE BBU 602. LTE radio 601 comprises antennas, amplifiers, filters, modulation, analog-to-digital interfaces, DSP, memory, and transceivers that are coupled over bus circuitry. LTE BBU 602 comprises memory, CPU, and transceivers that are coupled over bus circuitry. The memory in BBU 602 stores operating systems and network applications like PHY, MAC, RLC, PDCP, and RRC. The CPU in LTE BBU 602 executes the operating systems, PHYs, MACs, RLCs, PDCPs, and RRCs to exchange: LTE signaling and user data with UE 410, S1-MME signaling for UE 410 with MME 431 in NFVI 420, and exchange S1-U data for UE 410 with SAE GW-U 433 in NFVI 420. UE 410 is wirelessly coupled to the antennas in LTE radio 601 over an LTE link. A transceiver in LTE radio 601 is coupled to a transceiver in LTE BBU 602 over CPRI links. A transceiver in LTE BBU 602 is coupled to MME 431 and SAE GW-U 433 over backhaul links.

In LTE radio 601, the antennas receive wireless LTE signals from UE 410 that transport UL LTE signaling and UL LTE data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The LTE RRC processes the UL LTE signaling and DL S1-MME signaling from MME 431 to generate new UL S1-MME signaling and new DL LTE signaling. The LTE RRC transfers the new UL LTE S1-MME signaling to MME 431. The LTE PDCP transfers corresponding UL S1-U user data to SAE GW-U 433 over the backhaul links.

In LTE BBU 602, the LTE RRC receives the DL S1-MME signaling from MME 431. The LTE PDCP receives DL S1-U user data from SAE GW 433. The LTE network applications process the new DL LTE signaling and the DL LTE data to generate corresponding DL LTE symbols that carry the DL LTE signaling and DL LTE data. In LTE radio 601, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals to UE 410 that transport the DL LTE signaling and DL data.

RRC functions comprise authentication, security, handover control, status reporting, QoS, network broadcasts and pages, and network selection. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

Figure 7:
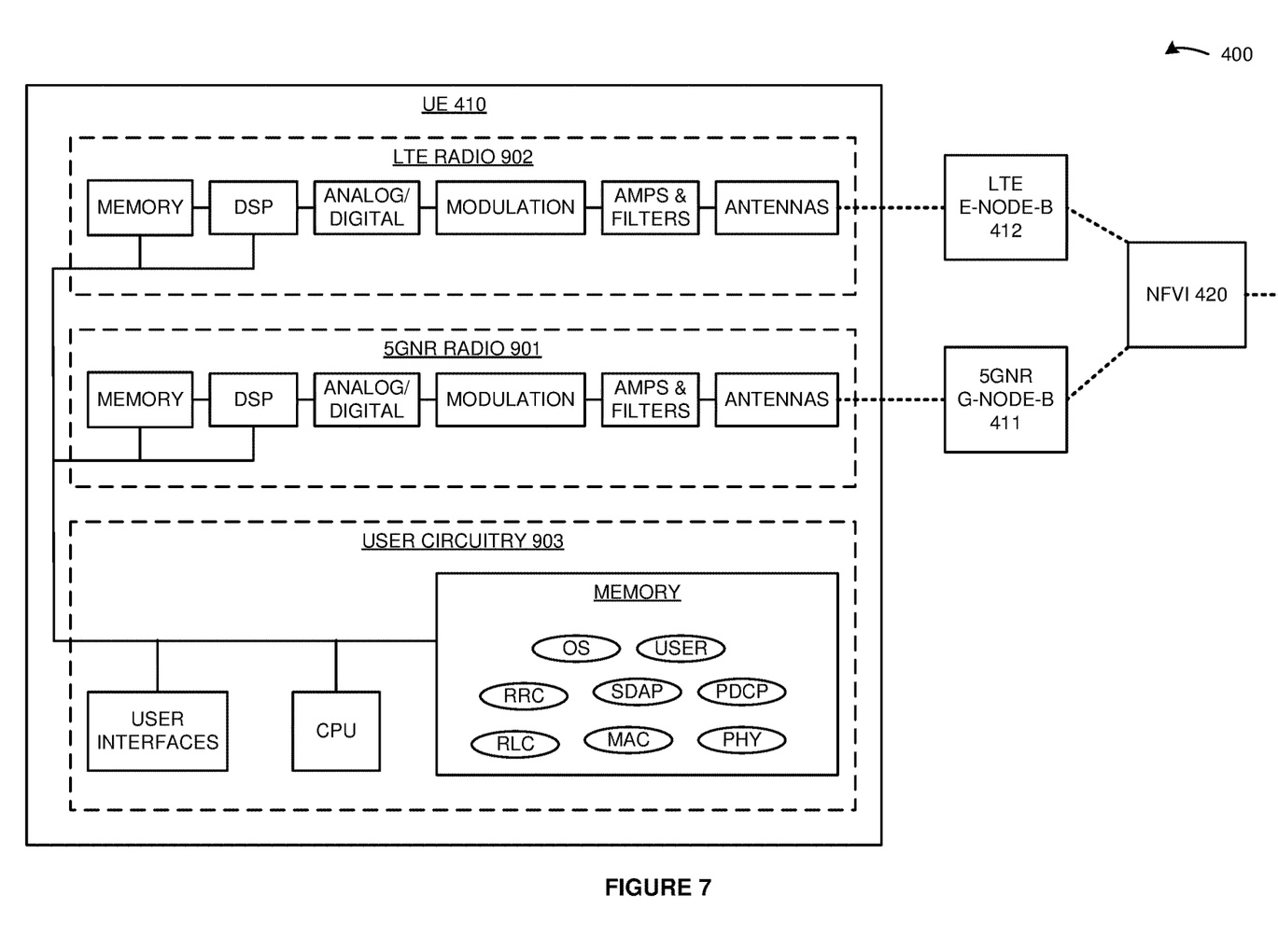
FIG. 7 illustrates the wireless UE that handsover in the 5G/LTE network.

FIG. 7 illustrates wireless UE 410 that handover in 5GNR/LTE network 400. UE 410 is an example of UE 110, although UE 110 may differ. UE 410 comprises 5GNR radio 901, LTE radio 902, and user circuitry 903 that are coupled over bus circuitry. Radios 901-902 comprise antennas, amplifiers, filters, modulation, analog-to-digital interfaces, DSP, and memory that are coupled over bus circuitry. User circuitry 903 comprises user interfaces, CPU, and memory that are coupled over bus circuitry. The antennas in radios 901-902 are wirelessly coupled to NodeBs 411-412. The user interfaces in user circuitry 903 comprise graphic displays, machine controllers, sensors, cameras, transceivers, and/or some other user components. The memory in user circuitry 903 stores an operating system, user applications (USER), and network applications (PHY, MAC, RLC, PDCP, SDAP, and RRC). The CPU in user circuitry 903 executes the operating system and the user applications to generate and consume user data. The CPU in user circuitry 903 executes the operating system and the network applications to wirelessly exchange corresponding signaling and data with NodeBs 411-412 over radios 901-902.

In 5GNR radio 901, the antennas receive wireless 5GNR signals from 5GNR gNodeB 411 that transport DL 5GNR signaling and DL 5GNR data. The antennas transfer corresponding electrical DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL 5GNR symbols from the DL digital signals. The CPUs execute the network applications to process the DL 5GNR symbols and recover the DL 5GNR signaling and the DL 5GNR data. The 5GNR RRC processes the DL 5GNR signaling and user signaling from the operating system to generate new UL 5GNR signaling and new DL user signaling. The 5GNR network applications process the new UL 5GNR signaling and the UL 5GNR data to generate corresponding UL 5GNR symbols that carry the UL 5GNR signaling and UL 5GNR data. In 5GNR radio 901, the DSP processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless 5GNR signals to 5GNR gNodeB 411 that transport the UL 5GNR signaling and UL 5GNR data.

In LTE radio 902, the antennas receive wireless LTE signals from LTE eNodeB 412 that transport DL LTE signaling and DL LTE data. The antennas transfer corresponding electrical DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL LTE symbols from the DL digital signals. The CPUs execute the network applications to process the DL LTE symbols and recover the DL LTE signaling and the DL LTE data. The LTE RRC processes the DL LTE signaling and user signaling from the operating system to generate new UL LTE signaling and new DL user signaling. The LTE network applications process the new UL LTE signaling and the UL LTE data to generate corresponding UL LTE symbols that carry the UL LTE signaling and UL LTE data. In LTE radio 902, the DSP processes the UL LTE symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless LTE signals to LTE eNodeB 412 that transport the UL LTE signaling and UL LTE data.

RRC functions comprise authentication, security, handover control, status reporting, QoS, network broadcasts and pages, and network selection. SDAP functions include packet marking and QoS enforcement. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

The 5GNR RRC in user circuitry 903 attaches to 5GNR gNodeB 411 over 5GNR radio 901. The 5GNR RRC and gNodeB 411 exchange 5GNR signaling over 5GNR radio 901. In response to the 5GNR signaling, the 5GNR SDAP in user circuitry 903 and 5GNR gNodeB 411 exchange 5GNR data over 5GNR radio 901. The 5GNR PHY in user circuitry 903 measures and reports the signal strength for 5GNR gNodeB 411 to the 5GNR RRC. The LTE PHY in user circuitry 903 measures and reports the signal strength for LTE eNodeB 412 to the LTE RRC which reports the data to the 5GNR RRC. The 5GNR RRC in user circuitry 903 reports the signal strength measurements to 5GNR gNodeB 411 over radio 901. The 5GNR RRC in user circuitry 903 receives 5GNR signaling from 5GNR gNodeB 411 over 5GNR radio 901 that directs UE 410 to handover from 5GNR gNodeB 411 to LTE eNodeB 412. The LTE RRC in user circuitry 903 attaches to LTE eNodeB 412 over LTE radio 902. The LTE RRC and LTE eNodeB 412 exchange LTE signaling over LTE radio 902. In response to the LTE signaling, the LTE PDCP in user circuitry 903 and LTE eNodeB 412 exchange LTE data over LTE radio 902.

Figure 8:
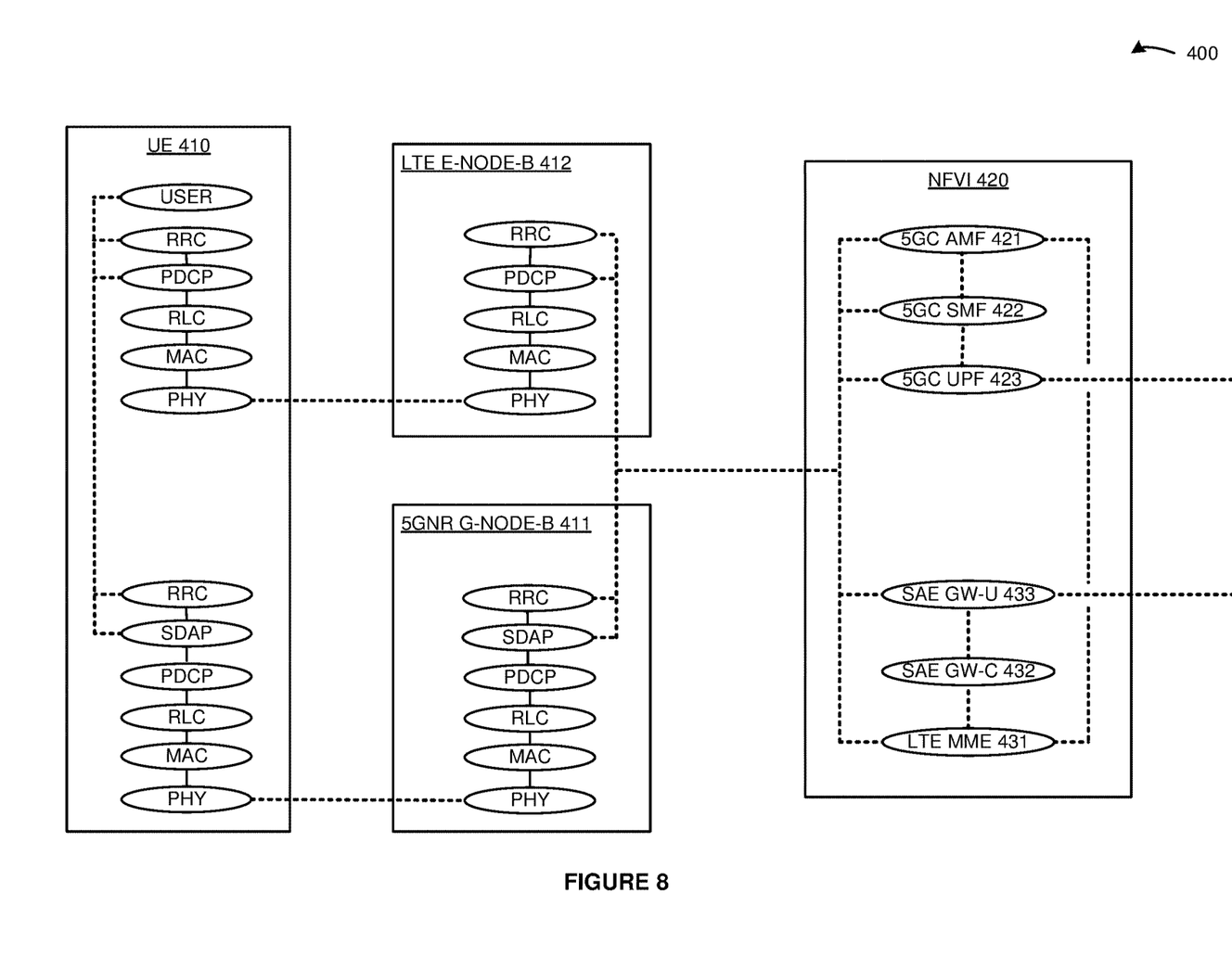
FIG. 8 illustrates an exemplary operation of the 5G/LTE network to handover the wireless UE.

FIG. 8 illustrates an exemplary operation of 5GNR/LTE network 400 to handover wireless UE 410. Before the handover from 5GNR gNodeB 411 to LTE eNodeB 412, the 5GNR RRC in UE 410 and the 5GNR RRC in 5GNR gNodeB 111 wirelessly exchange 5GNR signaling over their 5GNR PDCPs, RLCs, MACs, and PHYs. In response, the SDAP in wireless UE 410 and the SDAP in 5GNR gNodeB 111 wirelessly exchange 5GNR data over their 5GNR PDCPs, RLCs, MACs, and PHYs. The 5GNR RRC in 5GNR gNodeB 411 and 5GC AMF 421 in NFVI 420 exchange N2 signaling. The 5GNR SDAP in 5GNR gNodeB 411 and 5GC UPF 423 in NFVI 420 exchange N3 data.

An event at UE 410 like loss-of-signal or voice-fallback triggers the handover. In this example, 5GC AMF 421 receives voice fallback signaling from an Internet Protocol Multimedia Subsystem (IMS) for UE 410 that is currently attached to 5GNR gNodeB 411. AMF 421 signals handover information for UE 410 to 5GC SMF 422 in a PDU context request. In response, 5GC SMF 422 selects SAE GW-C 432 because SAE GW-C 432 is physically co-located with UPF 423. 5GC SMF 422 transfers signaling indicating the ID for SAE GW-C 432 to AMF 431. AMF 431 maintains a data structure that correlates SAE GW-Cs with their controlling MMEs. Using the data structure, AMF 431 selects MME 431 since MME 431 controls co-located SAE GW-C 432. AMF 431 transfers a relocation request indicating UE 410, SAE GW-C 432, and LTE eNodeB 412 to LTE MME 431. LTE MME 431 transfers S1-MME signaling to LTE eNodeB 412 and S11 signaling to SAE GW-C 432. Efficiently, MME 431 obtains the ID for SAE GW-C 432 without accessing a DNS. SAE GW-C 432 signals SAE GW-U 433 to serve UE 410 over LTE eNodeB 412. SAE GW-U 433 serves UE 410 over LTE eNodeB 412.

After the handover from 5GNR gNodeB 411 to LTE eNodeB 412, the LTE RRC in UE 410 and the LTE RRC in LTE eNodeB 112 wirelessly exchange LTE signaling over their LTE PDCPs, RLCs, MACs, and PHYs. In response, the PDCP in wireless UE 410 and the PDCP in LTE eNodeB 112 wirelessly exchange LTE data over their LTE PDCPs, RLCs, MACs, and PHYs. The LTE RRC in LTE eNodeB 412 and MME 431 exchange S1-MME signaling. The LTE PDCP in LTE eNodeB 412 and SAE GW-U in NFVI 420 exchange S1-U data.

Figure 9:
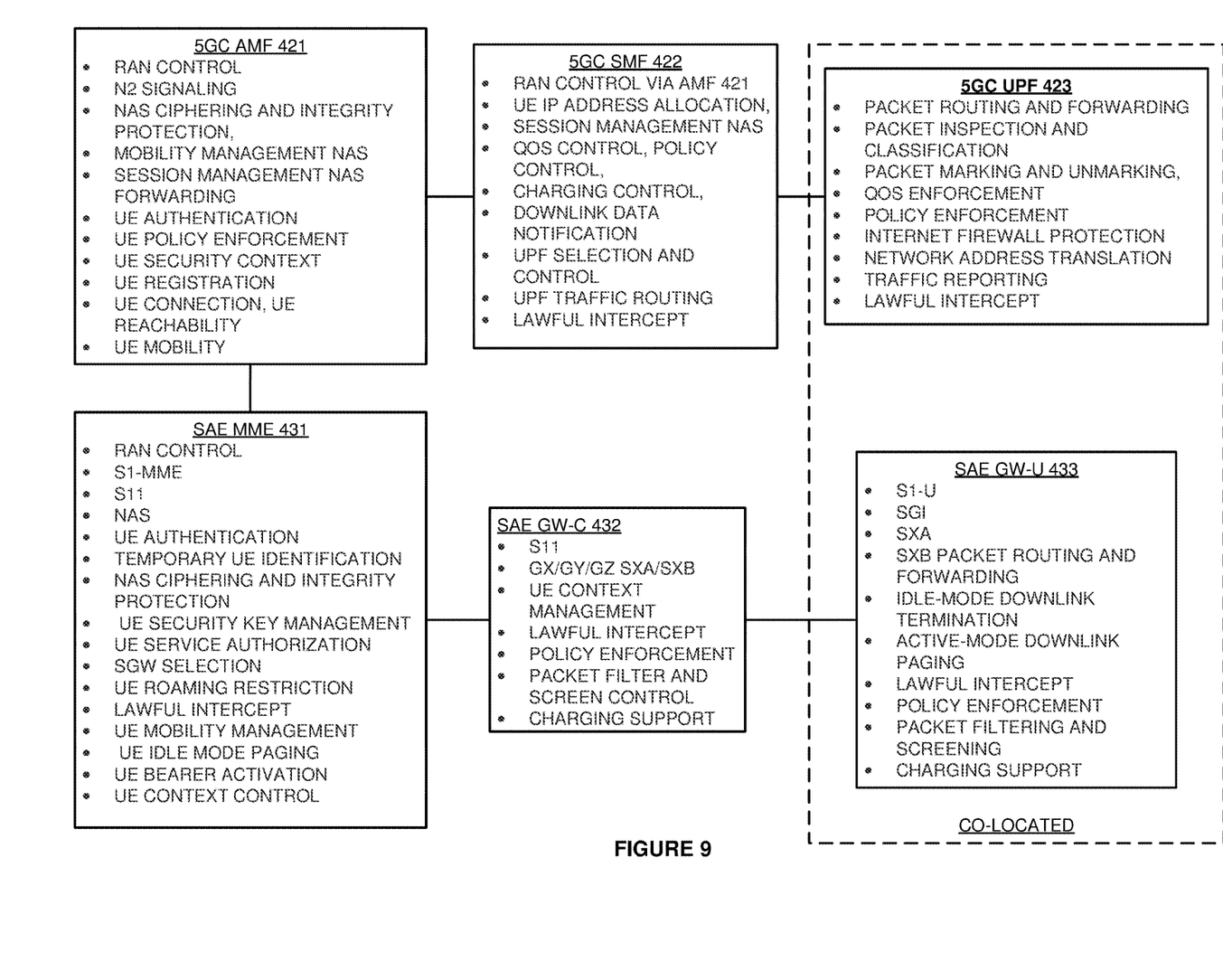
FIG. 9 illustrates a Fifth Generation Core (5GC) Access and Mobility Management Function (AMF), 5GC Session Management Function (SMF), 5GC User Plane Function (UPF), LTE Mobility Management Entity (MME), System Architecture Evolution Gateway Control Plane (SAE GW-C), and System Architecture Evolution Gateway User Plane (SAE GW-U) to handover the wireless UE.

FIG. 9 illustrates 5GC AMF 421, 5GC SMF 422, 5GC UPF 423, LTE MME 431, SAE GW-C 432, and SAE GW-U 433 to handover wireless UE 410 in 5G/LTE network 400. 5GC AMF 421 performs Radio Access Network (RAN) control, N2 termination, NAS ciphering and integrity protection, mobility management Non-Access Stratum (NAS) termination, session management NAS forwarding, LTE authentication, and UE policy enforcement. 5GC AMF 421 manages UE security context, UE registration, UE connection, UE reachability, and UE mob ty. 5GC SMF 422 performs RAN control via AMF 421, UE Internet Protocol (IP) address allocation, session management NAS termination, QoS control, policy control, charging control, downlink data notification, UPF selection and control, UPF traffic routing, and lawful intercept. 5GC UPF 423 performs packet routing and forwarding, packet inspection and classification, packet marking, QoS enforcement, policy enforcement, internet firewall protection, network address translations, traffic reporting, and lawful intercept.

MME 431 performs RAN control, S1-MME termination, S11 termination, NAS termination, UE authentication, temporary UE identification, NAS ciphering and integrity protection, UE security key management, UE service authorization, SGW selection, UE roaming restriction, lawful intercept, UP mobility management, UE idle mode paging, UP bearer activation, and UE context control. SAE GW-C 432 performs S11 termination, Gx/Gy/Gz termination, Sxa termination, Sxb termination, UE context management, lawful intercept, policy enforcement, packet filter and screen control, and charging support. SAE GW-U 433 performs S1-U termination, SGi termination, Sxa termination, Sxb termination, packet routing and forwarding, idle-mode downlink termination, active-mode downlink paging, lawful intercept, policy enforcement, packet filtering and screening, and charging support.

Before the handover 5GC AMF 421 authenticates and authorizes UP 410 for wireless data services. 5GC AMF 421 signals 5GNR gNodeB 411 and 5GC SMF 422 to serve UP 410. 5GC SMF 422 allocates UE IP addresses, selects QoS and policy, and selects and controls UPF 423. 5GC UPF 423 routes packets for UE 410 per the QOS, policy, addressing, and marking. 5GC AMF 421 detects a handover based on signaling from gNodeB 411 (signal loss) or an IMS (fallback). 5GC AMF 421 signals handover information for UE 410 to 5GC SMF 422 in a PDU context request.

In this example, 5GC SMF 422 selects SAE GW-U 433 for UE 410 because SAE GW-U 431 is physically co-located with UPF 423 which currently serves UE 410. 5GC SMF 422 signals the ID for SAE GW-U 433 to AMF 421. AMF 421 maintains a data structure that correlates SAE GW-Us with their controlling MMEs. AMF 421 selects MME 431 since MME 431 controls co-located SAE GW-U 433. AMF 421 transfers a relocation request for UE 410 that indicates SAE GW-U 433 to LTE MME 431.

MME 431 maintains a data structure that correlates SAE GW-Us with their controlling SAE GW-Cs. MME 431 selects SAE GW-C 432 since GW-C 432 controls co-located SAE GW-U 433. MME 431 transfers S1-MME signaling to LTE eNodeB 412 and S11 signaling to SAE GW-C 432. Efficiently, MME 431 obtains the ID for SAE GW-U 433 without accessing a DNS. SAE GW-C 432 signals SAE GW-U 433 to serve UE 410 over LTE eNodeB 412. SAE GW-U 433 serves UE 410 per the QoS, policy, and addressing over LTE eNodeB 412.

The wireless data network circuitry described above comprises computer hardware and software that form special-purpose network circuitry to handover wireless UEs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to handover wireless UEs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to handover a wireless User Equipment (UE), the method comprising:
 a Fifth Generation (5G) access node wirelessly exchanging user data with the wireless UE and exchanging the user data with a 5G User Plane Function (UPF);
 the 5G UPF exchanging the user data with the 5G access node and exchanging the user data with another data communication system;
 a 5G Core (5GC) identifying a handover of the wireless UE from the 5G access node to a Long Term Evolution (LTE) access node, and in response, selecting an LTE Gateway Identifier (GW ID) for an LTE gateway (LTE GW) comprising a System Evolution Architecture Gateway User Plane (SAE GW-U) and an SAE GW Control Plane (SAE GW-C), wherein the LTE GW is physically co-located with the 5G UPF, selecting an SAE GW-U identifier for the SAE GW-U that is co-located with the 5G UPF, and transferring handover signaling indicating the LTE GW ID and an LTE access node ID to an LTE Mobility Management Entity (MME);
 the LTE MME receiving the network signaling indicating the LTE GW ID and the LTE access node ID, and in response, transferring access signaling to the LTE access node and transferring session signaling to the LTE gateway without accessing a Domain Name System (DNS) to identify the LTE gateway;
the LTE access node wirelessly exchanging additional user data with the wireless UE and exchanging the additional user data with the LTE GW in response to the access signaling; and
the LTE gateway exchanging the additional user data with the LTE access node and exchanging the additional user data with the other data communication network in response to the session signaling.

2. The method of claim 1 wherein the 5GC identifying the handover comprises an Access and Mobility Management Function (AMF) identifying the handover.

3. The method of claim 1 wherein the 5GC selecting the LTE GW ID comprises a Session Management Function (SMF) selecting the LTE GW ID.

4. The method of claim 1 wherein the 5GC transferring the handover signaling comprises an Access and Mobility Management Function (AMF) transferring the handover signaling.

5. The method of claim 1 wherein the 5GC selecting the LTE GW ID comprises an Access and Mobility Management Function (AMF) selecting the LTE GW ID.

6. The method of claim 1 wherein:
the 5GC selecting the LTE GW ID for the LTE gateway that is physically co-located with the 5G UPF comprises selecting an SAE GW-C ID for the SAE GW-C which is co-located with the 5G UPF.

7. The method of claim 1 wherein:
the LTE gateway exchanging the additional user data comprises the SAE GW-C receiving the session signaling from the LTE MME and transferring GW signaling to the SAE-GW-U; and
the LTE gateway exchanging the additional user data comprises the SAE GW-U exchanging the additional user data with the wireless UE and exchanging the additional user data with the other data communication system in response to the GW signaling.

8. The method of claim 1 wherein the handover is triggered based on one of a signal-strength comparison between the 5G access node and the LTE access node, voice-fallback from the 5G access node to the LTE access node, or load-balancing across the 5G access node and the LTE access node.

9. The method of claim 1 wherein the physical co-location of the 5G UPF and the LTE GW comprises a same data center hosting the 5G UPF and the LTE GW.

10. The method of claim 1 wherein the physical co-location of the 5G UPF and the LTE GW comprises a same Network Function Virtualization Infrastructure (NFVI) executing a UPF Virtual Network Function (VNF) that comprises at least a portion of the 5G UPE and executing a GW VNF that comprises at least a portion of the LTE GW.

11. A wireless communication network to handover a wireless User Equipment (UE), the wireless communication network comprising:
a Fifth Generation (5G) access node configured to wirelessly exchange user data with the wireless UE and exchange the user data with a 5G User Plane Function (UPF);
the 5G UPF configured to exchange the user data with the 5G access node and exchange the user data with another data communication system;
a 5G Core (5GC) configured to identify a handover of the wireless UE from the 5G access node to a Long Term Evolution (LTE) access node, and in response, to select an LTE Gateway Identifier (GW ID) for an LTE gateway (LTE GW) comprising a System Evolution Architecture Gateway User Plane (SAE GW-U) and an SAE GW Control Plane (SAE GW-C), wherein the LTE GW is physically co-located with the 5G UPF, select an SAE GW-U identifier (SAE GW-U ID) for the SAE GW-U that is co-located with the 5G UPF, and transfer handover signaling indicating the LTE GW ID and an LTE access node ID to an LTE Mobility Management Entity (MME);
the LTE MME configured to receive the network signaling indicating the LTE GW ID and the LTE access node ID, and in response, transfer access signaling to the LTE access node and transfer session signaling to the LTE gateway without accessing a Domain Name System (DNS) to identify the LTE gateway;
the LTE access node configured to wirelessly exchange additional user data with the wireless UE and exchange the additional user data with the LTE GW in response to the access signaling; and
the LTE gateway configured to exchange the additional user data with the LTE access node and exchange the additional user data with the other data communication network in response to the session signaling.

12. The wireless communication network of claim 11 wherein the 5GC comprises an Access and Mobility Management Function (AMF) configured to identify the handover.

13. The wireless communication network of claim 11 wherein the 5GC comprises a Session Management Function (SMF) configured to select the LTE GW ID.

14. The wireless communication network of claim 11 wherein the 5GC comprises an Access and Mobility Management Function (AMF) configured to transfer the handover signaling.

15. The wireless communication network of claim 11 wherein the 5GC comprises an Access and Mobility Management Function (AMF) configured to select the LTE GW ID.

16. The wireless communication network of claim 11 wherein:
the 5GC is configured to select an SAE GW-C ID for the SAE GW-C which is co-located with the 5G UPF.

17. The wireless communication network of claim 11 wherein:
the SAE GW-C is configured to receive the session signaling from the LTE MME and transfer GW signaling to the SAE GW-U; and
the SAE GW-U is configured to exchange the additional user data with the wireless UE and exchange the additional user data with the other data communication system in response to the GW signaling.

18. The wireless communication network of claim 11 wherein the handover is triggered based on one of a signal-strength comparison between the 5G access node and the LTE access node, voice-fallback from the 5G access node to the LTE access node, or load-balancing across the 5G access node and the LTE access node.

19. The wireless communication network of claim 11 wherein the physical co-location of the 5G UPF and the LTE GW comprises a same data center hosting the 5G UPF and the LTE GW.

20. The wireless communication network of claim 11 wherein the physical co-location of the 5G UPF and the LTE GW comprises a same Network Function Virtualization Infrastructure (NFVI) executing a UPF Virtual Network Function (VNF) that comprises at least a portion of the 5G UPF and executing a GW VNF that comprises at least a portion of the LTE GW.

\* \* \* \* \*